H. BERGHOEFER

3,477,689

PIPE COUPLING CONTAINING A VALVE

Filed Nov. 2, 1966

INVENTOR
HANS BERGHÖFER
BY
ATTORNEY

Nov. 11, 1969   H. BERGHOEFER   3,477,689
PIPE COUPLING CONTAINING A VALVE
Filed Nov. 2, 1966   6 Sheets-Sheet 6

INVENTOR
HANS BERGHÖFER
BY
ATTORNEY

United States Patent Office 3,477,689
Patented Nov. 11, 1969

3,477,689
PIPE COUPLING CONTAINING A VALVE
Hans Berghoefer, Alte. Landstrasse 274,
Hamburg-Poppenbuettel, Germany
Filed Nov. 2, 1966, Ser. No. 591,531
Int. Cl. F16k 5/02; F16l 37/28
U.S. Cl. 251—149.9                23 Claims

ABSTRACT OF THE DISCLOSURE

A hose coupling wherein a housing which is provided with communicating fluid-admitting and fluid-discharging passages accommodates a rotary valve member having a main opening in communication with the fluid-discharging passage, a second opening which communicates with the fluid-admitting passage in an open position of the valve, and a third opening accommodating a portion of a first ball which normally extends into the main opening but can be fully withdrawn into the third opening and into a recess of the housing in a predetermined second position of the valve. The latter is further provided with a second ball which permanently extends into the main opening. This main opening can receive a male connector which has an axial slot for reception of the second ball and a radial slot which receives the first ball when the connector is inserted in the second position of the valve and is thereupon rotated in the housing to rotate the valve in the fluid-discharging passage.

---

The present invention relates to pipe couplings in general, and more particularly to improvements in couplings between a tap, cock or an analogous valve and a flexible or rigid pipe which admits a fluid to or receives a fluid from the valve. Still more particularly, the invention relates to improvements in couplings of the type disclosed in Patent No. 3,100,619 to Berghöfer et al.

The aforementioned patent discloses a coupling which may be utilized to establish connections between gas consuming appliances and gas lines. The coupling comprises projections and balls provided in the interior of the valve housing and a male connector or plug which can be introduced into the housing and is provided with cutouts and bores to respectively receive the projections and the balls. The valve may be opened or closed in response to rotation of the male connector with reference to the housing.

Such couplings are very satisfactory when used with a given type of fluid, e.g., with city gas. However, a careless workman is likely to couple the valve with a connector which is provided on a pipe serving to convey only water or another liquid medium. Alternatively, the operator might attach a gas pipe to a valve housing which is connected with a source of liquid medium. This might lead to accidents, for example, when a hose which is intended to convey compressed air is attached to a source of city gas.

Accordingly, it is an important object of the present invention to provide a coupling for use in systems which convey liquid or gaseous media and which is constructed and assembled in such a way that its parts may be properly assembled only when each thereof is intended to convey the same type of fluid.

Another object o fthe invention is to provide a coupling which can be assembled only if the male part is designed to convey that type of fluid which can be supplied by the female part of the coupling, or vice versa.

A further object of the invention is to provide a coupling which can be readily adjusted so that one of its main component parts may be used to convey either a liquid or a gaseous fluid or one or more different types of gaseous or liquid fluid.

An additional object of the invention is to provide a coupling whose components are automatically sealed in response to separation from each other.

Another object of the invention is to provide a coupling which is automatically connected with the atmosphere when the pressure in its interior drops below a predetermined value.

A concomitant object of the invention is to provide a very simple resetting or adjusting mechanism which can be utilized in the improved coupling to convert it for use in connection with different types of fluids, always in such a way that a fresh adjustment is necessary if the personnel in charge wishes to convert the coupling for use with a different type of fluid.

Still another object of my invention is to provide a coupling which occupies little room and whilch can prevent sudden surges in fluid pressure in response to changes in the rate of fluid flow through the parts of the coupling.

Briefly stated, one feature of my invention resides in the provision of a pipe or hose coupling for conveying gaseous or liquid fluids. The coupling comprises a preferably stationary female connector having first coupling elements arranged in a predetermined relation with reference to each other, and a male connector adapted to be received in the female connector and having second coupling element each engageable with one of the first coupling elements if the relationship between the second coupling elements corresponds to the relationship between the first coupling elements so that only a given type of male connector is receivable in the female connector, or vice versa. The female connector can be permanently connected with a source of water, compressed air, city gas or another fluid, and the male connector can be secured to one end of a hose or pipe which is arranged to supply fluid to a washing machine, to a gas oven, to a plenum chamber for compressed air or to another consumer of fluid.

Due to the fact that a given male connector can be coupled only with one type of female connectors, errors and resultant accidents or damages stemming, for example, from connection of a hose for water with a source of gas or vice versa are eliminated in a very simple and reliable way.

In accordance with another feature of my invention, one of the connectors may be provided with a suitable selector which can change the position of one or more coupling elements on the respective connector so that, for example, a female connector can be readily converted to take different types of male connectors.

The novel features which are considered as characteristic of the invention are set forth in particular in the appended claims. The improved coupling itself, however, both as to its construction and the mode of operating the same, together with additional features and advantages thereof, will be best understood upon persual of the following detailed description of certain specific embodiments with reference to the accompanying drawings, in which.

Figures 1, 2:
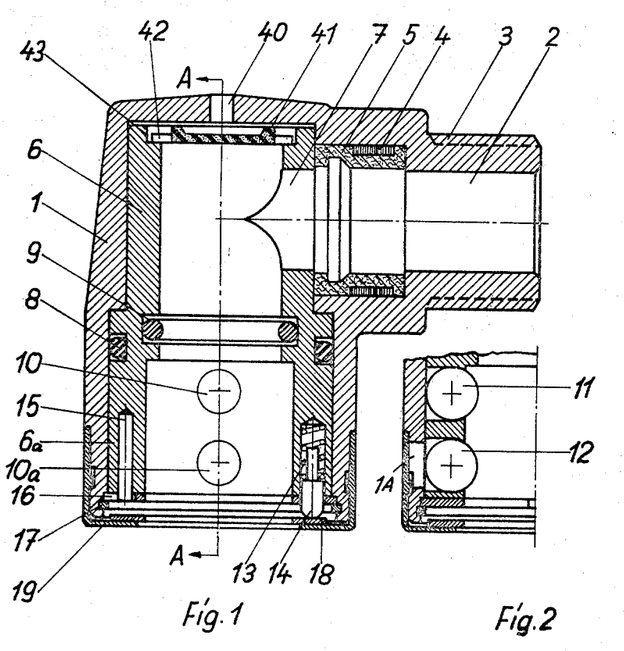
FIG. 1 is an axial section through a female connector which embodies one form of my invention and comprises a one-piece valve member.
FIG. 2 is a fragmentary axial section as seen in the direction of arrows from the line A—A of FIG. 1.

Referring first to FIGS. 1 and 2, there is shown a female connector which is a valve having a housing 1 provided with an inlet 2 surrounded by external threads 3 adapted to mesh with the threads of a nipple provided at the discharge end of a supply pipe, not shown. The housing 1 accommodates an annular gasket 5 installed in the inlet 2 and located upstream of a turnable one-piece valve member 6. The gasket 5 is surrounded by a reinforcing sleeve 4. The valve member 6 has a fluid-admitting opening 7 which can be moved into partial or full registery with the inlet 2 and this valve member is further provided with external and internal annular grooves for sealing rings 8 and 9.

The lower section or cage 6a of the valve member 6 is formed with radially extending circular bores 10, 10a which respectively accommodate spherical coupling elements 11 and 12 shown in FIG. 2. The inner end portions of the bores 10, 10a are of reduced diameter so that the coupling elements 11, 12 are retained therein against inward movement beyond the positions shown in FIG. 2. A locking pin 14 extends into an axially parallel blind bore in the end face of the section 6a and is biased outwardly by a helical expansion spring 13. The end face of the section 6a is further provided with a second axially parallel blind bore for a locating pin 15 and is adjacent to a control ring 16 non-rotatably mounted in the housing 1 and held against axial movement by a split ring 17. An axially movable shifting ring 18 abuts against the head of the locking pin 14 and is retained by a cap 19 which is applied over the discharge end of the housing 1.

The housing is provided with an aerating aperture 40 which can be sealed by a disk-shaped ventilating valve 41 having radially outwardly extending projections or prongs 42 received in a recess 43 at the upper axial end of the valve member 6.

Figure 10:
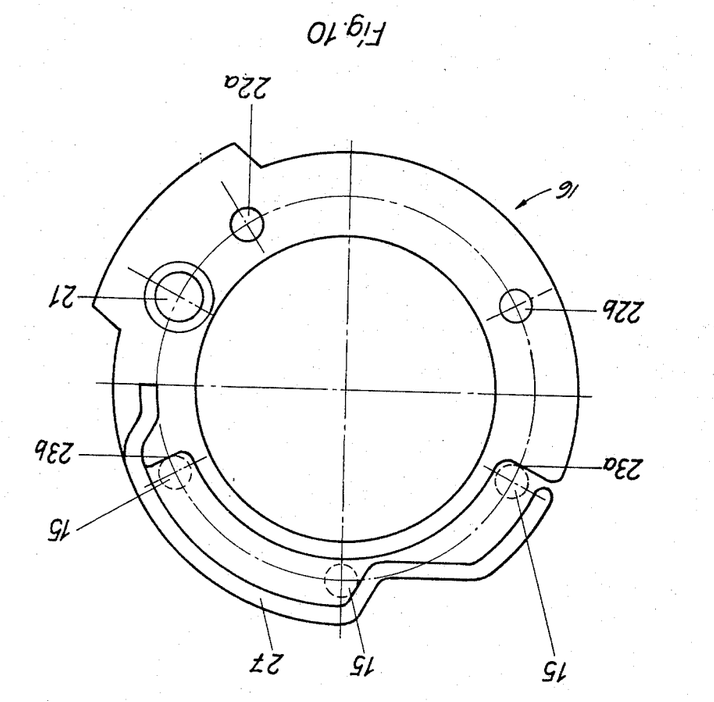
FIG. 10 is a plan view of a control member which is utilized in the female connector of FIG. 1 or 3.

The configuration of the control ring 16 is shown in FIG. 10. This ring has a locking bore 21 and additional bores 22a, 22b. Radial stop shoulders 23a, 23b can cooperate with the locating pin 15 which is shown in three different positions. A specially configurated braking spring 27 extends along an arc between the stop shoulders 23a and 23b.

Figure 3:
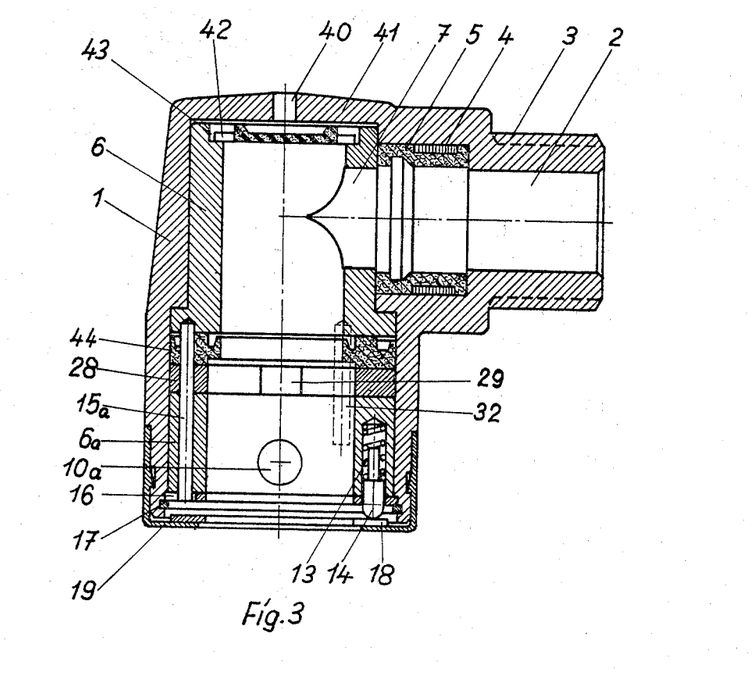
FIG. 3 is an axial section through a modified female connector which comprises a two-piece valve member.
Figure 4:
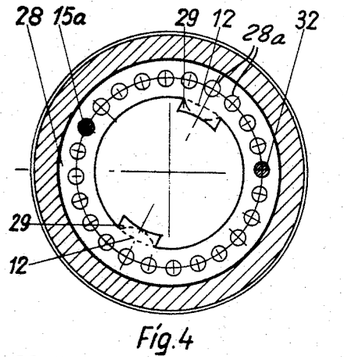
FIG. 4 is a horizontal section through the female connector of FIG. 3 and illustrates one position of a ring-shaped selector which is disposed between the two sections of the valve member.
Figure 5:
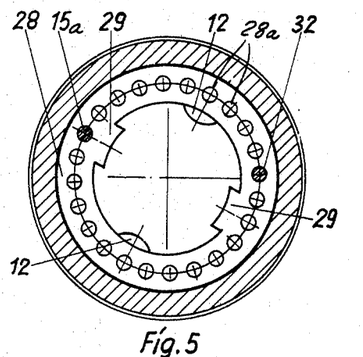
FIG. 5 illustrates a different angular position of the ring-shaped selector.

FIGS. 3 to 5 illustrate a modified female connector or valve wherein the valve member comprises two relatively movable annular sections including an upper section 6 provided with the fluid-admitting aperture 7 and a lower section or cage 6a. The sections 6 and 6a are separated from each other by a ring-shaped selector 28 and an annular gasket 44 having concentric annular lips one of which bears against the internal surface of the housing 1. The locating pin 15a is longer than the locating pin 15 of FIG. 1. A second locating pin 32 is angularly spaced from but parallel to the pin 15a. The spherical coupling elements 11 of FIG. 2 are replaced by inwardly extending coupling projections 29 of the selector 28. This selector has an annulus of preferably (but not necessarily) equidistant axially parallel bores 28a which are shown in FIGS. 4 and 5.

Figure 6:
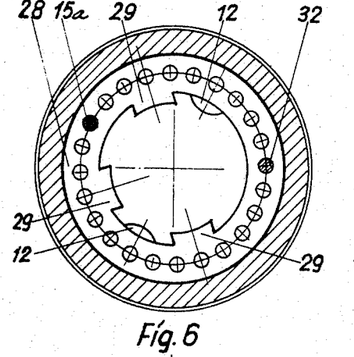
FIG. 6 is a horizontal section through a female connector which is similar to the one shown in FIG. 3 but comprises a different ring-shaped selector.
Figure 7:
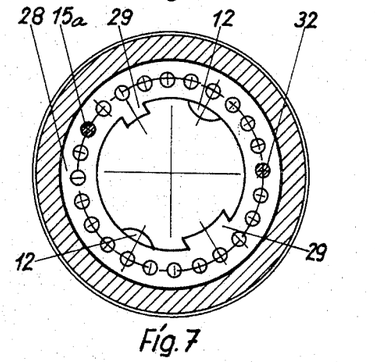
FIG. 7 is a similar horizontal section but showing a further ring-shaped selector.

FIG. 6 shows a slight modification of the female connector which was described in connection with FIGS. 3 to 5. The selector 28 of FIG. 6 has three coupling projections 29. In FIG. 7, the selector 28 has two differently dimensioned projections 29.

Figure 8:
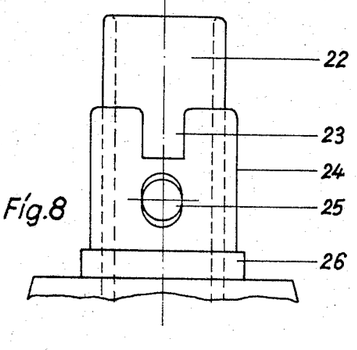
FIG. 8 is a side elevational view of a male connector which can be coupled with the housing of the female connector shown in FIG. 1 or 3.
Figure 9:
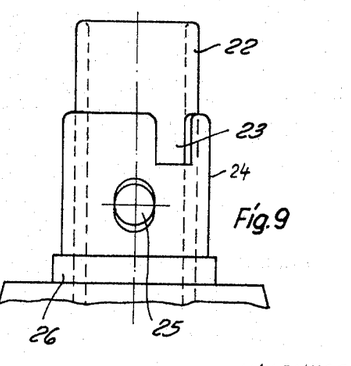
FIG. 9 is a side elevational view of a modified male connector which can be coupled with the female connector of FIG. 3 when the selector assumes a position intermediate the positions shown in FIGS. 4 and 5.

FIGS. 8 and 9 show two male connectors each secured to one end of a hose (not shown) which can receive a fluid from the housing 1 of a female connector. Each male connector comprises an inner tubular member 22 and an outer tubular member 24, the latter having an end face formed with recesses 23 and being provided with radially extending bores 25. The tubular member 24 can be said to be composed of two integral coupling elements one of which is formed with the recesses 23 and the other of which is formed with the bores 25. A collar 26 serves as an actuating means to shift the ring 18 when the male connector of FIG. 8 or 9 is fully inserted into a complementary housing 1.

Figure 12:
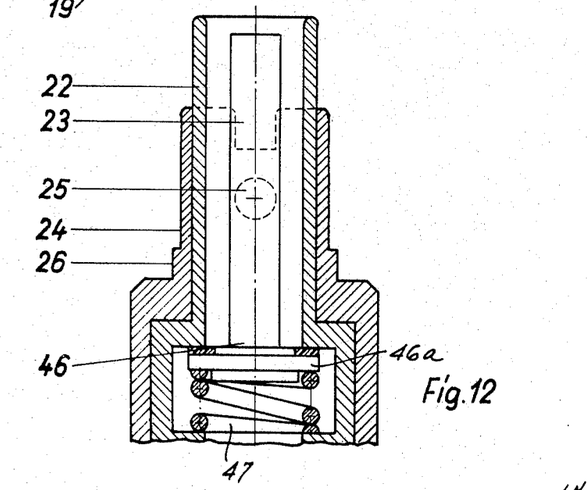
FIG. 12 is an axial section through a male connector which can be coupled with the female connector of FIG. 11.

FIG. 12 shows a modified male connector which is provided with a built-in one-way valve having a stem 46 carrying a disk 46a biased by a helical spring 47. The male connector of FIG. 14 comprises a built-in one-way valve 55 having a flap 56.

The operation is as follows:

The male connector of FIG. 8 can be properly introduced into the housing 1 of FIG. 1 only and alone if the recesses 23 and bores 25 of its coupling elements are in the same relative positions as the bores 10 and 10a of the valve member 6. In FIG. 1, the axes of the bores 10 and 10a are located in a plane which includes the axis of the valve member 6. Each recess 23 then receives a portion of a coupling element 11 and each bore 25 registers with a bore 10a. The collar 26 shafts the ring 18 so that the locking pin 14 moves axially and out of the locking bore 21 of the control ring 16 and compresses the spring 13. The head of the locking pin 14 is rounded and can readily slide along the control ring 16 when the valve member 6 is turned by the male connector through the intermediary of coupling elements 11, 12 and coupling elements constituting the member 24. The male connector can rotate the valve member 6 because the coupling elements 11 extend into the recesses 23. The coupling elements 12 rotates with the valve member 6 because they extend into the bores 10a. The elements 12 will be caused to enter the aligned bores 25 when the valve member 6 begins to turn because the cutouts 1A of the housing 1 (see FIG. 2) register with the bores 10a only when the valve member 6 is in the fully closed position. The function of coupling elements 12 is to prevent separation of the male connector from the housing 1 when the valve member 6 moves away from its closed position, i.e., the male connector of FIG. 8 can be detached only when the coupling elements 12 return into registry with the respective cutouts 1A and the valve member 6 seals the inlet 2 from the discharge end of the housing 1.

The control ring 16 is held against rotation with reference to the housing 1. During turning of the valve member 6, the locating pin 15 travels between the stop shoulders 23a, 23b while the rounded head of the locking pin 14 travels from the locking bore 21 toward and past the bore 22a and toward the bore 22b (see FIG. 10). The bores 22a, 22b act not unlike detents because the operator feels when one of these bores receives the head of the pin 14. This indicates that the valve member 6 has assumed a predetermined intermediate position. The head of the pin 14 will extend through the locking bore 21 and will prevent rotation of the valve member 6 when the latter assumes a closed position and when the connector of FIG. 8 is detached, i.e., when the spring 13 is free to expand. This insures that liquid or gas which fills the inelt 2 cannot escape when the male connector is detached from the housing 1.

On its way back from the shoulder 23b toward the shoulder 23a, i.e., when the valve member 6 moves from open toward closed position, the locating pin 15 must overcome the resistance of the braking spring 27 shown in FIG. 10. This reduces the speed at which the valve shuts off the flow of fluid to prevent sudden pressure surges in the piping. The provision of the braking spring 27 is of particular advantage when the coupling of the present invention is used in piping which conveys water or another liquid. Sudden pressure surges in a water line could cause serious damages. Many presently known water lines use relief valves which open automatically in response to a pressure surge of predetermined magnitude. The spring 27 replaces such relief valves by insuring that the movement of valve meber 6 to closing position is slowed down prior to compelte shutdown so that the pressure of fluid builds up gradually without undesirable pressure peaks.

When the valve member 6 is held in partly or fully open position, the ventilating valve 41 closes automatically in response to pressure of fluid which flows through the housing 1 between the inlet 2 and the inner tubular member 22 of the male connector. However, if the pressure in the housing 1 drops below atmospheric pressure, the valve 41 moves away from the aperture 40. For example, and if the pressure in the inlet 2 drops below the pressure of surrounding air, the aperture 40 admits air andp. revents the inelt from sucking fluid out of the conduit which carries the male connector of FIG. 8.

The valve 41 is of importance in water lines because it prevents return flow of contaminated water through the male connector and housing 1 when the water pressure upstream of the inlet 2 drops. When the valve 41 opens, the inlet 2 can receive air but no liquid can flow back from the discharge end of the housing 1.

The opeartion of the valve shown in FIG. 3 is analogous. The housing 1 of this valve can be coupled with the male connector of FIG. 8 because the coupling projection 29 of its selector 28 is aligned with the bore 10a. Thus, and when the members 22, 24 of the male connector are pushed into the housing 1 of FIG. 3, the recesses 23 will receive the projections 29 and the bores 25 will register with the bores 10a. When the housing 1 is to be coupled with a different male connector, for example, with the male connector of FIG. 9 wherein the bores 25 are not in alignment with the recesses 23, the angular position of the selector 28 with reference to the valve member 6 must be change in a manner shown in FIGS. 4 and 5. Thus, the locating pins 15a and 32 must be removed or partially withdrawn whereupon the selector 28 is free to turn and to place its projections 29 into a desired position with reference to the valve member. The locating pins 15a, 32 are thereupon reinserted and the male connector of FIG. 9 can be coupled with the housing 1 when the coupling elements 12 and coupling projections 29 assume the positions similar to those shown in FIG. 5. It is to be noted that FIGS. 4 and 5 show a selector 28 with two projections 29 and a valve member section 6a with two spherical coupling elements 12. Therefore, the male connector shown in FIGS. 8 or 9 must have two receses 23 and two bores 25. However, it is equally within the purview of the present invention to provide the seletcor 28 with one, three or more coupling projections 29 and to modify the male connector and the valve member accordingly. The number of bores 28a in the selector 28 will determine the number of different angular positions of the projections 29 with reference to the elements 12 shown in FIGS. 4 and 5. The number of such angular positions can be increase by providing the selector 28 with bores 28a which are drilled at different distances from each other. As a rule, the angular position of coupling elements 12 with reference to the opening 7 of the valve member 6 will remain unchanged. The locating pin 32 constitutes an optional safety feature because the locating pin 15a can hold the selector 28 in any desired angular position.

If a male connector is to be used with the female connector of FIG. 6, it must have three recesses 23 each of which can receive one of the projections 29 on the selector ring 28. A male connector which is to be used with the female connector of FIG. 7 must have a wider recess 23 and a narrower recess 23 so that it can properly receive the two differently dimensioned projections 29 of the selector ring 28.

A very important advantage of the female connector shown in FIGS. 3 to 5 is that it can be readily adjusted to take different male connectors. Thus, by the simple expedient of changing the angular position of the selector 28, an operator can adjust the female connector to take the male connector of FIG. 8 or 9 or another male connector having two bores 25 and two recesses 23. For example, the male connector of FIG. 8 may be connected to a hose for city gas and the male connector of FIG. 9 may be connected to a water hose or to a hose for compressed air. The water hose cannot be connected to the female connector of FIG. 3 unless the operator adjusts the selector 28 so that the angular relationship between the coupling projections 29 and bores 10a will be the same as that between the recesses 23 and bores 25. This eliminates accidents and renders it possible to use one type of female connectors (FIG. 3) with many types of male connectors but always with a single type of male connectors at a time. Since the female connector is the most expensive part of the coupling, its adjustability brings about considerable savings because a city department or a factory can order several types of male connectors and a single type of female connectors each of which can be readily adjusted to cooperate with a selected male connector.

The gasket 44 of FIG. 3 is used when simple O-rings (such as the rings 8, 9 of FIG. 1) are not satisfactory in connection with a given type of fluid. As shown in FIG. 3, the gasket 44 has a centrally located annular reinforcing bead disposed between the aforementioned outer lip which engages the housing 1 and an inner lip which can engage with the inner tubular member 22 of a male connector. The centrally located bead has two axially parallel bores which respectively receive the locating pins 15a, 32 with a minimum of clearance. This bead maintains the sections 6, 6a of the valve member at a desired axial distance from each other.

Figure 11:
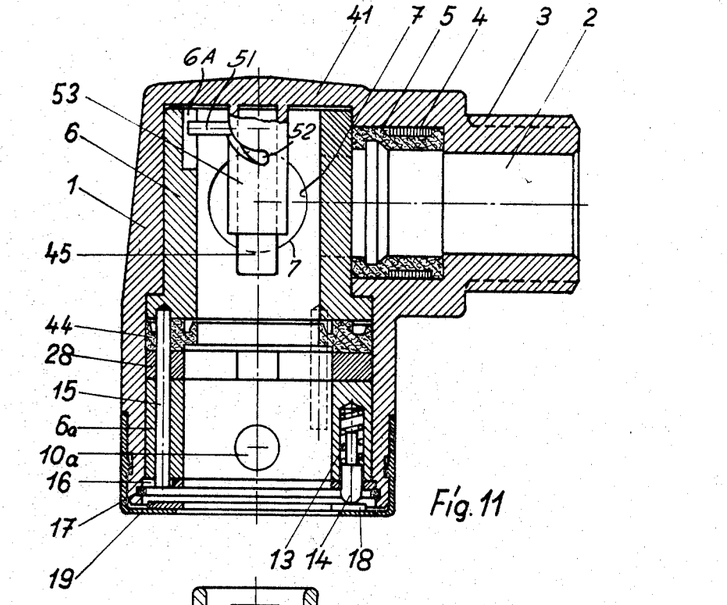
FIG. 11 is an axial section through a further female connector which is provided with means for opening a one-way valve in a male connector.

FIG. 11 shows a further female connector provided with a device which can automatically open the one-way valve of FIG. 12 when the male connector of FIG. 12 is coupled with the housing 1. This housing is provided with an internal guide sleeve 53 which is coaxial with the valve member 6 and has a helical guide slot 52. A stem 45 which is reciprocable in the sleeve 53 has a radial arm 51 extending through the slot 52 and into an axially parallel internal groove 6A of the valve member 6. When the valve member rotates, the stem 45 is caused to move axially toward or away of the stem 46 in the tubular member 22 of the male connector shown in FIG. 12. The stem 46 displaces the disk 46a against the bias of the valve spring 47 so that the disk 46a moves away from an annular seat in the male connector. When the male connector is detached, the spring 47 automatically holds the disk 46a in sealing position. The disk 46a will assume such sealing position before the male connector of FIG. 12 is detached from the housing 1. The stem 45 will cause the disk 46a to move away from its seat in response to movement of the opening 7 into registry with the inlet 2. When the valve member 6 seals the inlet 2 from the member 22, the stem 45 allows the valve spring 47 to maintain the disk 46a in sealing position. Thus, the one-way valve in the male connector of FIG. 12 opens only when the opening 7 of the valve member 6 conveys fluid but the disk 46a is held in sealing position when the valve member 6 of FIG. 1 is moved to closed position as well as when the male connector of FIG. 12 is detached from the housing 1.

The one-way valve of FIGS. 11 and 12 will be needed when the interior of the pipe or hose fixed to the male connector of FIG. 12 remains under superatmospheric pressure is detached from the male connector is detached from the housing 1. The one-way valve then prevents escape of fluid from the pipe or hose. For example, the male connector of FIG. 12 can be used to convey propane or another gas to a plenum chamber. When the male connector is detached from the housing 1, the disk 46a automatically assumes a closed position and seals the plenum chamber from the atmosphere.

The one-way valve may be opened in response to turning of the male connector through a predetermined angle, for example, 100 degrees.

Of course, the housing 1 can also accommodate a one-way valve to prevent outflow of fluid when the male connector is detached. Such one-way valve can be opened in automatic response to insertion of the male connector. This may be desirable when an appliance (for example, a washing machine) is connected with a water main by means of my improved coupling and the user wishes to prevent water from spilling from the male connector is removed from the housing 1.

Figure 13:
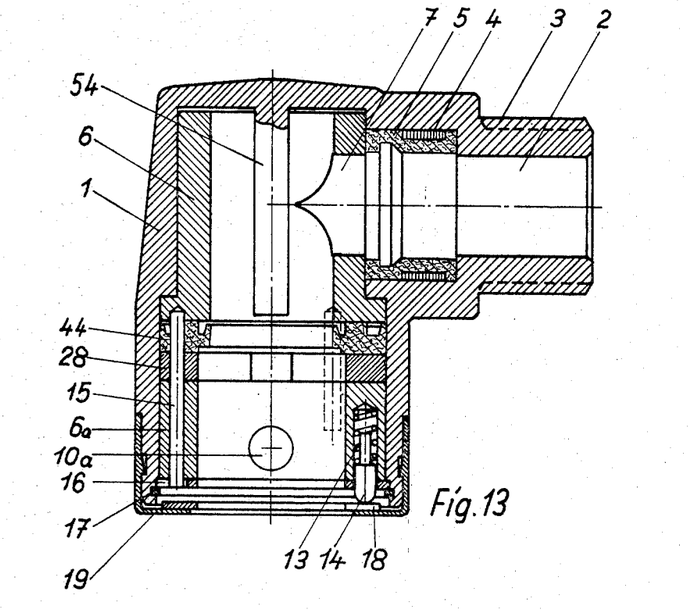
FIG. 13 is an axial section through another female connector which is also provided with means for opening a one-way valve in a male connector.
Figure 14:
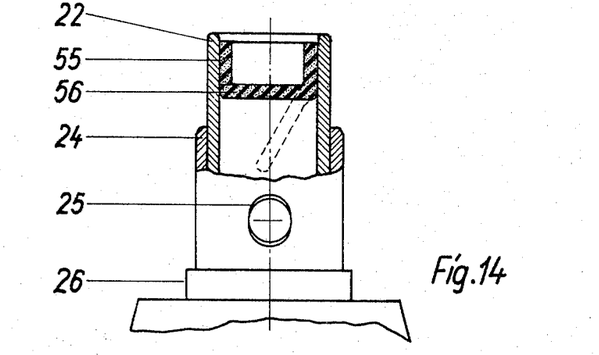
FIG. 14 is a partly elevational and partly sectional view of a male connector which can be coupled with the female connector of FIG. 13.

The female connector of FIG. 13 can be coupled with the male connector of FIG. 14. The fixed stem 54 of the housing 1 then automatically opens the one-way valve 55 in the member 22 by moving the flap 56 from sealing position. The open position of this flap 56 is shown in FIG. 14 by broken lines.

What is claimed as new and desired to be protected by Letters Patent is:

1. A coupling, particularly a hose coupling, comprising a housing member having communicating fluid-admitting and fluid-discharging passages and at least one recess extending outwardly from one of said passages; a rotary valve received in said one passage and having a first opening communicating with said one passage, a second opening communicating with said first opening, a third opening communicating with said first opening, and a first spherical coupling element extending into said first opening, said valve being rotatable in said housing member between a plurality of positions including an open position in which said second opening communicates with the other of said passages and a second position in which said third opening registers with said recess; a second spherical coupling element received in said third opening and arranged to respectively extend into said first opening and into said recess in the open and second positions of said valve; and a connector member received in said first opening and having an axially extending recess accommodating said first coupling element and a radial recess accommodating said second coupling element in each but said second position of the valve so that said connector member can be withdrawn from the first opening only in said second position of the valve, said valve being rotated in said housing member in response to rotation of one of said members with reference to the other member and said coupling elements being angularly spaced from each other in the circumferential direction of said first opening, the angular distance between said coupling elements being identical with the angular distance between said axial recess and said radial recess.

2. A coupling as defined in claim 1, wherein said first opening is a bore having an open end and wherein said third opening is disposed between said open end and said first coupling element.

3. A coupling as defined in claim 2, said coupling elements is a sphere and wherein a portion of said first coupling element extends permanently into said bore.

4. A coupling as defined in claim 3, wherein said first coupling element is disposed between said second opening and the open end of said bore.

5. A coupling as defined in claim 1, wherein said valve has a fourth opening which accommodates a portion of said first coupling element.

6. A coupling as defined in claim 1, wherein said first opening is a bore having an open end and further comprising a locking member reciprocably mounted in said valve, means for biasing said locking member beyond said open end, and a ring-shaped control member mounted in said one passage adjacent to said open end, said control member having a locking bore registering with and receiving a portion of said locking member in the second position of said valve in response to withdrawal of said connector member from said first opening.

7. A coupling as defined in claim 6, wherein said control member comprises means for braking the valve during rotation from said open position.

8. A coupling as defined in claim 6, further comprising shifting means provided in said one passage outwardly adjacent to said control member in the path of movement of a portion of said connector member during insertion into said first opening and arranged to at least partially dislodge said locking member from said locking bore in response to insertion of said connector member to thus prevent rotation of said valve with reference to said housing member.

9. A coupling as defined in claim 1, further comprising ventilating valve means provided in said housing member and arranged to open in response to a pressure drop in said first opening below the pressure outside of said housing member.

10. A coupling as defined in claim 1, further comprising normally closed one-way valve means provided in said connector member and arranged to open in response to movement of said valve to open position.

11. A coupling as defined in claim 10, wherein said housing comprises a sleeve extending substantially axially into said one passage and having a helical guide slot, and further comprising an operating member reciprocably received in said sleeve and having an arm extending substantially radially through said helical slot and into a substantially axially extending groove provided in the internal surface of said valve so that said operating member moves axially in response to rotation of said valve, said one-way valve means being located in the path of movement of said operating member.

12. A coupling, particularly a hose coupling, comprising a housing member having communicating fluid-admitting and fluid-discharging passages and at least one recess extending outwardly from one of said passages; a rotary valve received in said one passage and having a first opening communicating with said one passage, a first ring-shaped section provided with a second opening which communicates with said first opening, a second ring-shaped section provided with a third opening which communicates with said first opening, a selector ring located between said sections and provided with a first coupling element, said sections and said ring being rotatable with reference to each other, and locating means for releasably connecting said first section with said second section and with said ring in one of a plurality of predetermined angular positions with reference to said first section and with reference to each other, said valve being rotatable in said housing member between a plurality of positions including an open position in which said second opening communicates with the other of said passages and a second position in which said third opening registers with said recess; a second coupling element received in said third opening and arranged to respectively extend into said first opening and into said recess in the open and second positions of said valve; and a connector member received in said first opening and having an axially extending recess accommodating said first element and a radial recess accommodating said second element in each but said second position of the valve so that said connector member can be withdrawn from the first opening only in said second position of the valve, said valve being rotated in said housing member in response to rotation of one of said members with reference to the other member.

13. A coupling as defined in claim 12, wherein said ring is provided with a plurality of axially parallel bores and said locating means comprises at least one pin removably extending into a bore provided in one of said sections, into one of said bores in said ring, and into a bore provided in the other section.

14. A coupling as defined in claim 12, wherein said valve further comprises an annular gasket having a first lip abutting against said housing member and a second lip abutting against said connector member, said gasket being disposed between said selector ring and one of said sections.

15. A coupling as defined in claim 12, further comprising ventilating valve means provided in said housing member and arranged to open in response to a pressure drop in said first opening below the pressure outside of said housing member.

16. A coupling as defined in claim 1, further comprising normally closed one-way valve means provided in said connector member and arranged to open in response to movement of said valve to open position.

17. A coupling as defined in claim 16, wherein said housing comprises a sleeve extending substantially axially into said one passage and having a helical guide slot, and further comprising an operating member reciprocably received in said sleeve and having an arm extending substantially radially through said helical slot and into a substantially axially extending groove provided in the internal surface of said valve so that said operating member moves axially in response to rotation of said valve, said one-way valve means being located in the path of movement of said operating member.

18. A coupling as defined in claim 12, wherein said first opening is a bore having an open end and further comprising a locking member reciprocably mounted in said valve, means for biasing said locking member beyond said open end, and a ring-shaped control member mounted in said one passage adjacent to said open end, said control member having a locking bore registering with and receiving a portion of said locking member in the second position of said valve in response to withdrawal of said connector member from said first opening.

19. A coupling as defined in claim 18, wherein said control member comprises means for braking the valve during rotation from said open position.

20. A coupling as defined in claim 18, further comprising shifting means provided in said one passage outwardly adjacent to said control member in the path of movement of a portion of said connector member during insertion into said first opening and arranged to at least partially dislodge said locking member from said locking bore in response to insertion of said connector member to thus permit rotation of said valve with reference to said housing member.

21. A coupling, particularly a hose coupling, comprising a housing member having communicating fluid-admitting and fluid-discharging passages and at least one recess extending outwardly from one of said passages; a rotary valve received in said one passage and having a first opening constituting a bore having an open end and communicating with said one passage, a second opening communicating with said first opening, a third opening communicating with said first opening, and a first coupling element extending into said first opening, and said valve being rotatable in said housing member between a plurality of positions including an open position in which said second opening communicates with the other of said passages and a second position in which said third opening registers with said recess; a second coupling element received in said third opening and arranged to respectively extend into said first opening and into said recess in the open and second positions of said valve; a connector member received in said first opening and having an axially extending recess accommodating said first element and a radial recess accommodating said second element in each but said second position of the valve so that said connector member can be withdrawn from the first opening only in said second position of the valve, said valve being rotated in said housing member in response to rotation of one of said members with reference to the other member; a locking member reciprocably mounted in said valve; means for biasing said locking member beyond the open end of said first opening; and a ring-shaped control member mounted in said one passage adjacent to the open end of said first opening, said control member having a locking bore registering with and receiving a portion of said locking member in the second position of said valve in response to withdrawal of said connector member from said first opening.

22. A coupling as defined in claim 21, wherein said control member comprises means for braking the valve during rotation from said open position.

23. A coupling as defined in claim 21, further comprising shifting means provided in said one passage outwardly adjacent to said control member in the path of movement of a portion of said connector member during insertion into said first opening and arranged to at least partially dislodge said locking member from said locking bore in response to insertion of said connector member to thus permit rotation of said valve with reference to said housing member.

References Cited

UNITED STATES PATENTS

| | | | |
|---|---|---|---|
| 3,100,619 | 8/1963 | Berghöfer et al. | 251—149.9 |
| 2,389,413 | 11/1945 | Carlton | 137—215 |

WILLIAM I. PRICE, Primary Examiner

U.S. Cl. X.R.

137—614.06